(12) United States Patent
Livesay et al.

(10) Patent No.: US 7,237,631 B2
(45) Date of Patent: Jul. 3, 2007

(54) VERTICAL IDLER ADJUSTER FOR TRACK TYPE WORK MACHINE

(75) Inventors: Richard E. Livesay, Peoria, IL (US); Glen A. Spindel, Divernon, IL (US)

(73) Assignee: Caterpillar Inc., Peoria, IL (US)

( * ) Notice: Subject to any disclaimer, the term of this patent is extended or adjusted under 35 U.S.C. 154(b) by 188 days.

(21) Appl. No.: 10/937,058

(22) Filed: Sep. 9, 2004

(65) Prior Publication Data

US 2006/0049692 A1    Mar. 9, 2006

(51) Int. Cl.
B62D 55/00    (2006.01)
(52) U.S. Cl. ..................... 180/9.52; 301/141
(58) Field of Classification Search ............. 305/120, 305/124–125, 127, 130–131, 141, 145, 150; 180/9.5, 9.52
See application file for complete search history.

(56) References Cited

U.S. PATENT DOCUMENTS

| 3,382,013 | A | * | 5/1968 | Toth et al. ................ 305/154 |
| 3,893,526 | A | * | 7/1975 | Esch ....................... 180/193 |
| 4,383,794 | A | * | 5/1983 | Sankey ..................... 414/694 |
| 4,840,437 | A |   | 6/1989 | Henry et al. |
| 5,246,246 | A | * | 9/1993 | Kendall .................... 280/677 |
| 6,401,847 | B1 |  | 6/2002 | Lykken |
| 6,761,236 | B2 | * | 7/2004 | Hibbert .................... 180/9.52 |

* cited by examiner

Primary Examiner—Jason R. Bellinger
(74) Attorney, Agent, or Firm—Liell + McNeil

(57) ABSTRACT

A work machine, and a work machine idler mounting assembly is provided, including a frame, a mounting member proximate an end of the frame, an idler support block adjacent the mounting member. At least one removeable spacer is positionable between the idler support block and the frame to adjust relative positions thereof.

19 Claims, 10 Drawing Sheets

VERTICAL IDLER ADJUSTER FOR TRACK TYPE WORK MACHINE

TECHNICAL FIELD

The present disclosure relates generally to track type work machines, and relates more particularly to a track type work machine having a vertical idler adjuster.

BACKGROUND

Track type work machines are in widespread use in construction, mining, forestry, and similar industries. In particular, bulldozers, cranes and pavers are commonly seen track type work machines along roads, freeways and at construction sites. "Tracks" rather than wheels are typically used on work machines operating in environments where creating sufficient traction with conventional tires is problematic or impossible. Rather than rolling across a work surface on wheels, track type work machines utilize one or more tracks extending about a plurality of rolling elements. Such tracks are typically made up of a loop of coupled metal links having outer sides that engage the ground or work surface, and inner sides travelling about the rolling elements, which can include various drive rollers, support rollers, tensioners and "idlers."

An idler in a track type work machine is a rolling element that passively rolls against the inner side of the track, and can have a plurality of teeth that engage against the bushings that join the track links as they roll about the same. The idler is typically positioned at an opposite end of the track roller frame to a drive wheel or sprocket, and supports that end of the track during operation. Rollers are typically positioned between the idler and the sprocket, and support the inner side of the track opposite the ground.

Over the course of work machine operation, the various moving parts of the track assembly can undergo significant wear. The track links, rollers, idlers and drive sprockets can all experience wear from the nearly constant metal-to-metal contact. For example, the idler can include grooves or pockets separating the teeth. A phenomenon known in the art as "tooth root wear" describes deepening of these pockets over time due to repetitive engagement and disengagement with the track, which in turn wears due to its corresponding engagement against the idler. A horizontal plane, located at the bottom of the idler, and intersecting bushings in the track can be defined as the idler plane. As the idler and bushings wear, the idler plane can actually migrate. The rollers will also tend to wear down as they operate against the track links over time. The "roller plane" may be thought of as a horizontal plane located at the bottom of the rollers, and intersecting bushings in the track. In a manner similar to the idler plane, wear of the track links and rollers can actually cause the roller plane to migrate.

In many common work machines, in which the idlers run on the links, the idlers, rollers and track links have traditionally been made of similar materials, for example steel, and thus the various elements have a tendency to wear at approximately the same rate. Accordingly, the relative distance between the roller plane and idler plane remains roughly the same over the course of many hours of operation. In the past, servicing of the work machine and replacement of the idlers, rollers and in some instances track links would take place at predetermined intervals, based generally on similar wear rates of the same.

In an attempt to prolong the life of certain of the work machine components, in recent years designers have begun to employ rotating bushings connecting side by side track links, and toothed idlers running on the rotating bushings. The wear rate of rotating bushings is relatively slow, as the rotating bushings can roll into and out of engagement with the other components rather than sliding. The rate of migration/translation of the idler plane is a function primarily of tooth root wear and rotating bushing wear, whereas the rate of migration/translation of the roller plane is a function primarily of roller wear and track link wear. Tooth root wear and rotating bushing wear tends to be slower than roller and link wear, and consequently the rate of change in the position of the idler plane tends to be slower than the rate of change in the position of the roller plane.

Where the rate of change in position of the roller plane outpaces the rate of change in the idler plane, the relative separation of the respective planes can change over time. For many work machine operations, it is desirable to maintain the roller plane and idler plane substantially at constant positions relative to one another. For example, if the idler plane lies at an inappropriate position relative to the roller plane, the ride, blade control or work surface finish can be compromised in certain operations.

The present disclosure is directed to one or more of the problems or shortcomings set forth above.

SUMMARY OF THE INVENTION

In one aspect, the present disclosure provides a track type work machine. The work machine includes, a roller frame, a rotatable idler, which includes an idler shaft, mounted proximate an end of the roller frame. A track extends about the idler, and the work machine includes a vertical idler adjuster disposed adjacent the idler shaft. The vertical idler adjuster includes at least one removable spacer to adjust a vertical position of the idler shaft relative to the roller frame.

In another aspect, the present disclosure provides a work machine idler mounting assembly. The idler mounting assembly includes a frame, and an idler support block disposed proximate an end of the frame. At least one removable spacer is positionable between the idler support block and the frame to adjust relative positions thereof.

In still another aspect, the present disclosure provides a method of vertically adjusting the position of a rotatable idler in a track type work machine. The method includes the steps of, relieving pressure on an idler adjuster supporting an idler shaft of the idler, and removing or inserting at least one spacer in the idler adjuster at a position between the idler shaft and a roller frame of the work machine to adjust the relative positions thereof.

DETAILED DESCRIPTION

Figure 1:
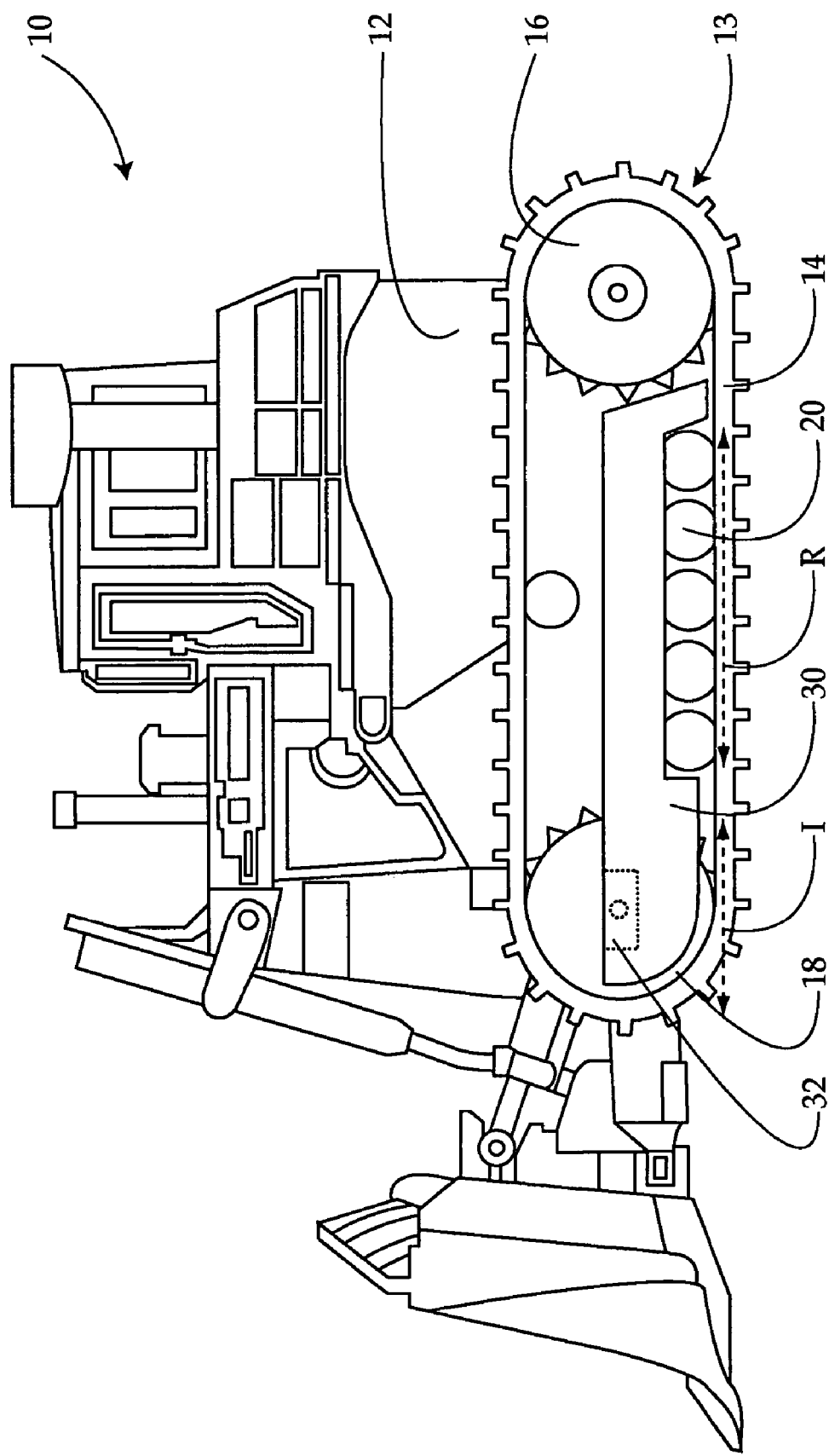
FIG. 1 is a side diagrammatic view of a work machine according to a preferred embodiment of the present disclosure.

Referring to FIG. 1, there is shown a work machine 10 that includes a work machine body 12 having a track assembly 13 mounted thereto. Track assembly 13 preferably includes a track roller frame 30 and a track 14. Track 14 preferably includes a plurality of links pivotably coupled to one another, and extends about a drive sprocket 16, an idler 18, and a plurality of rollers 20. A vertical idler adjuster 32 is preferably positioned proximate an end of roller frame 30 and is operable to adjust a vertical position of idler shaft 19 relative to roller frame 30. An idler plane "I" extends along the bottom of idler 18, whereas a roller plane "R" extends along the bottoms of rollers 20. Each of planes I and R is illustrated passing through the bushings (not shown) at the bottoms of idler 18 and rollers 20.

Figure 2:
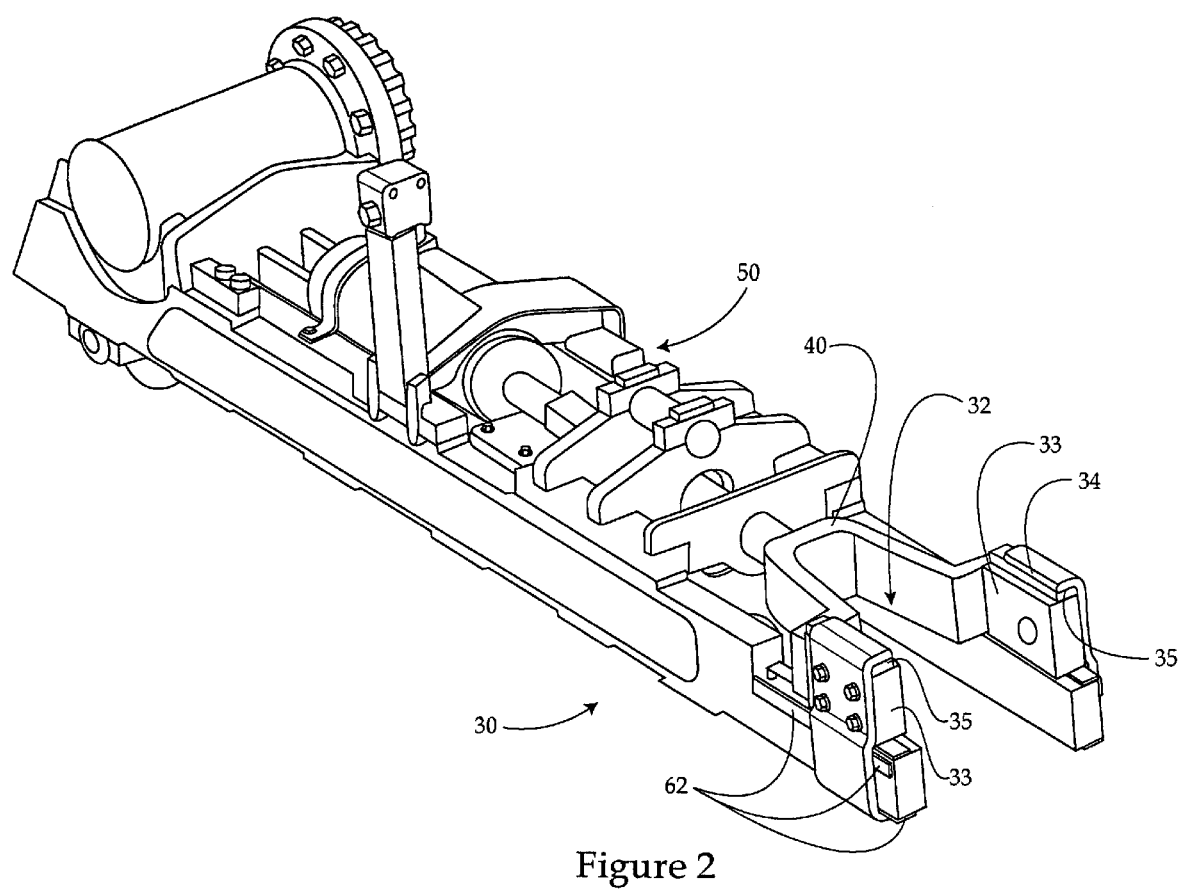
FIG. 2 is a perspective diagrammatic view of a track roller frame and vertical idler adjuster according for the work machine of FIG. 1.

Turning to FIG. 2, there is shown roller frame 30, and vertical idler adjuster 32 mounted thereon. In a preferred embodiment, idler adjuster 32 is slidable along a plurality of wear strips 62 mounted on roller frame 30, and is mounted to an idler yoke 40. Idler yoke 40 is in turn preferably connected to a horizontal actuator 50 for adjusting a horizontal position thereof in a conventional manner. Those skilled in the art will appreciate that roller frame 30 is shown as a conventional one-arm roller frame, however, other contemplated embodiments, described herein, may utilize a roller frame having upper and lower arms, or a different design altogether.

Figure 3:
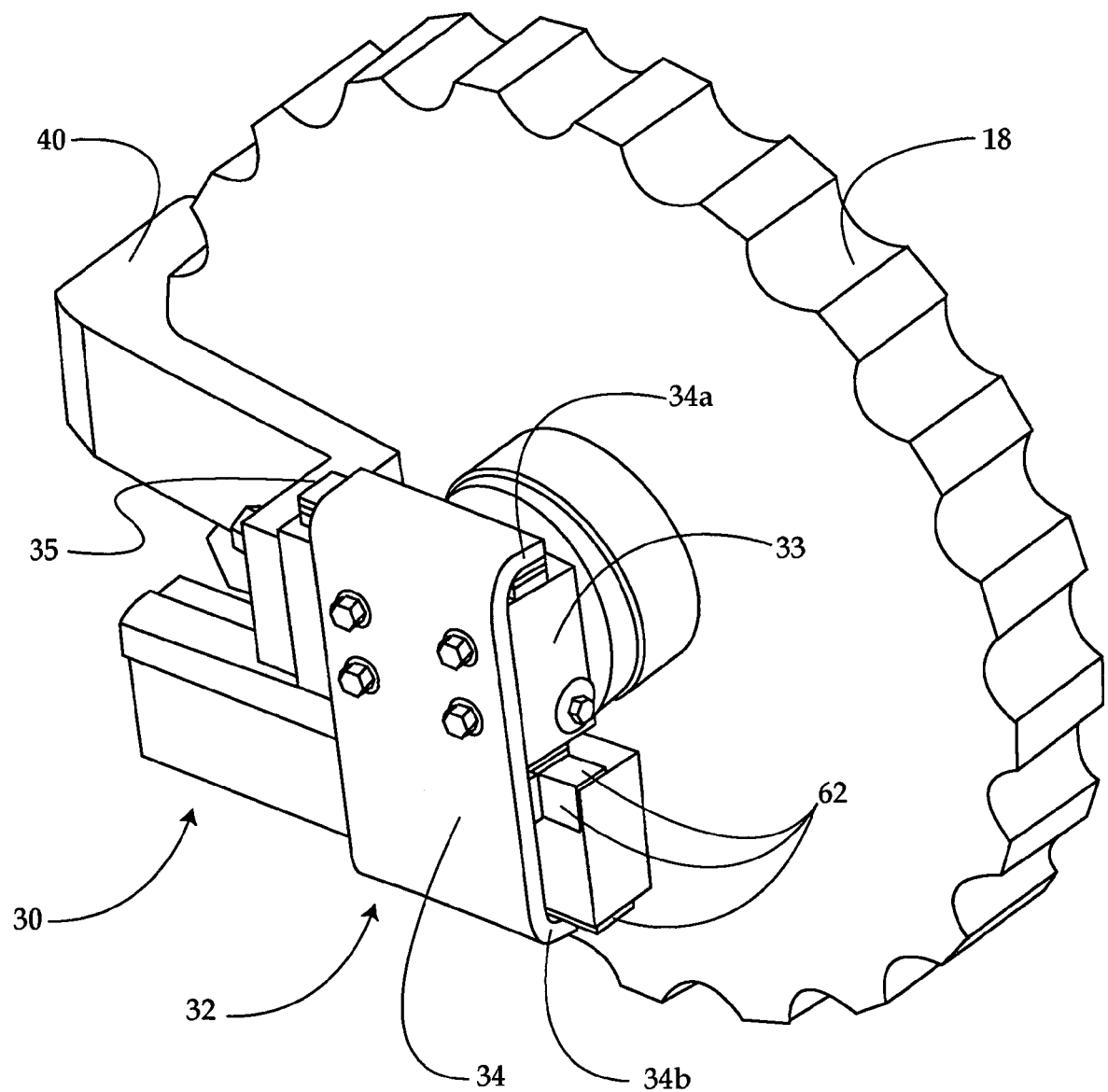
FIG. 3 is a diagrammatic perspective view of the idler and vertical idler adjuster of FIG. 2.

Referring also to FIG. 3, there is shown a partial view of the embodiment of FIG. 2, illustrating idler 18 mounted in yoke 40. Idler 18 is preferably supported in a set of support blocks 33, only one of which is shown. It should be appreciated that a vertical idler adjuster similar to idler adjuster 32 is preferably provided at first and second sides of idler 18. However, FIG. 3 illustrates only a first side thereof, and the present description should be understood to apply similarly to vertical idler adjusters disposed at both sides of idler 18.

Idler adjuster 32 preferably includes a mounting member 34, which may be a hook-like or C-shaped mounting member, and at least one spacer 35, preferably a plurality of spacers 35, disposed between support block 33 and mounting member 34. Spacers 35 are preferably identical to one another, and comprise elongate, metal pieces having at least one edge that is configured to be complementary to at least one of support block 33 and mounting member 34. Spacers having different thicknesses may be desirable in some applications. In addition, the spacers can be trapped with idler adjuster 32 by a variety of known means, and therefore need not necessarily include mating features. Still further embodiments are contemplated wherein spacers 35 are simple rectangular strips or shims carried in a stack with idler adjuster 32. In one preferred embodiment (not shown), each spacer 35 includes an arcuate or angular edge that fits with a complementary angular or arcuate edge in support block 33 such that spacers 35 cannot readily slip out of their respective positions between support block 33 and mounting member 34. Mounting member 34 is preferably substantially C-shaped, and includes a first end or first wall 34*a* engaged about spacers 35, and a second end or second wall 34*b* engaged about an underside of track roller frame 30, as illustrated in FIG. 3.

Figure 4:
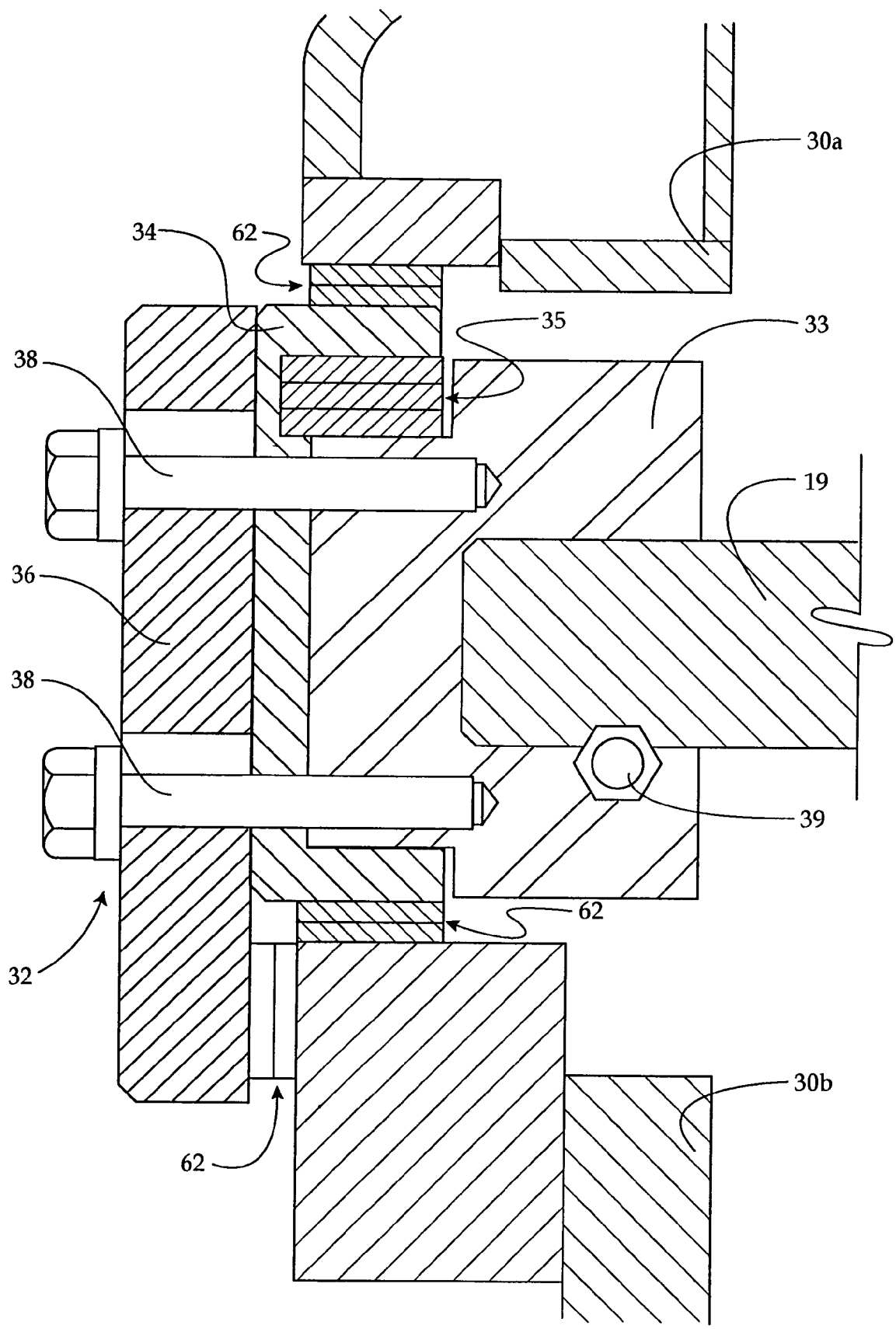
FIG. 4 is a sectioned diagrammatic end view of a vertical idler adjuster according to another preferred embodiment the present disclosure.

Turning to FIG. 4, there is shown another embodiment of an idler adjuster 32 according to the present disclosure, wherein numerals alike to those of FIGS. 1–3 are used to illustrate features and components also shown therein. Idler adjuster 32 of FIG. 4 is preferably mounted between a track roller frame upper arm 30*a* and a track roller frame lower arm 30*b*. Wear strips 62 are further preferably positioned at a sliding interface between upper and lower arms 30*a* and 30*b* and a mounting member 34, for example, a C-shaped mounting member. The "wear strips" shown in FIG. 4, and the other embodiments described herein, are preferably formed from a hardened metal, and are pinned to the respective components. It is contemplated that wear strips 62 may be replaced or shimmed to compensate for wear, as is known in the art.

At least one fastener 38, preferably two, are provided, and secure a side plate 36 to mounting member 34, preferably via an engagement with support block 33. Side plate 36 is preferably sized and positioned such that it will exclude dirt and other debris from the various components. Side plate 36 further provides an aesthetic covering for the components, and can transmit side loads from idler 18 to the track roller frame. Wear strips 62 are further preferably provided between side plate 36 and lower arm 30*b*. In one preferred embodiment, fasteners 38 are disposed in slots 38 allowing support block 33 to vertically adjust relative to side plate 36, as described herein. A wedge 39 is optionally provided for securing idler shaft 19 relative to support block 33 in a known manner.

Figure 5:
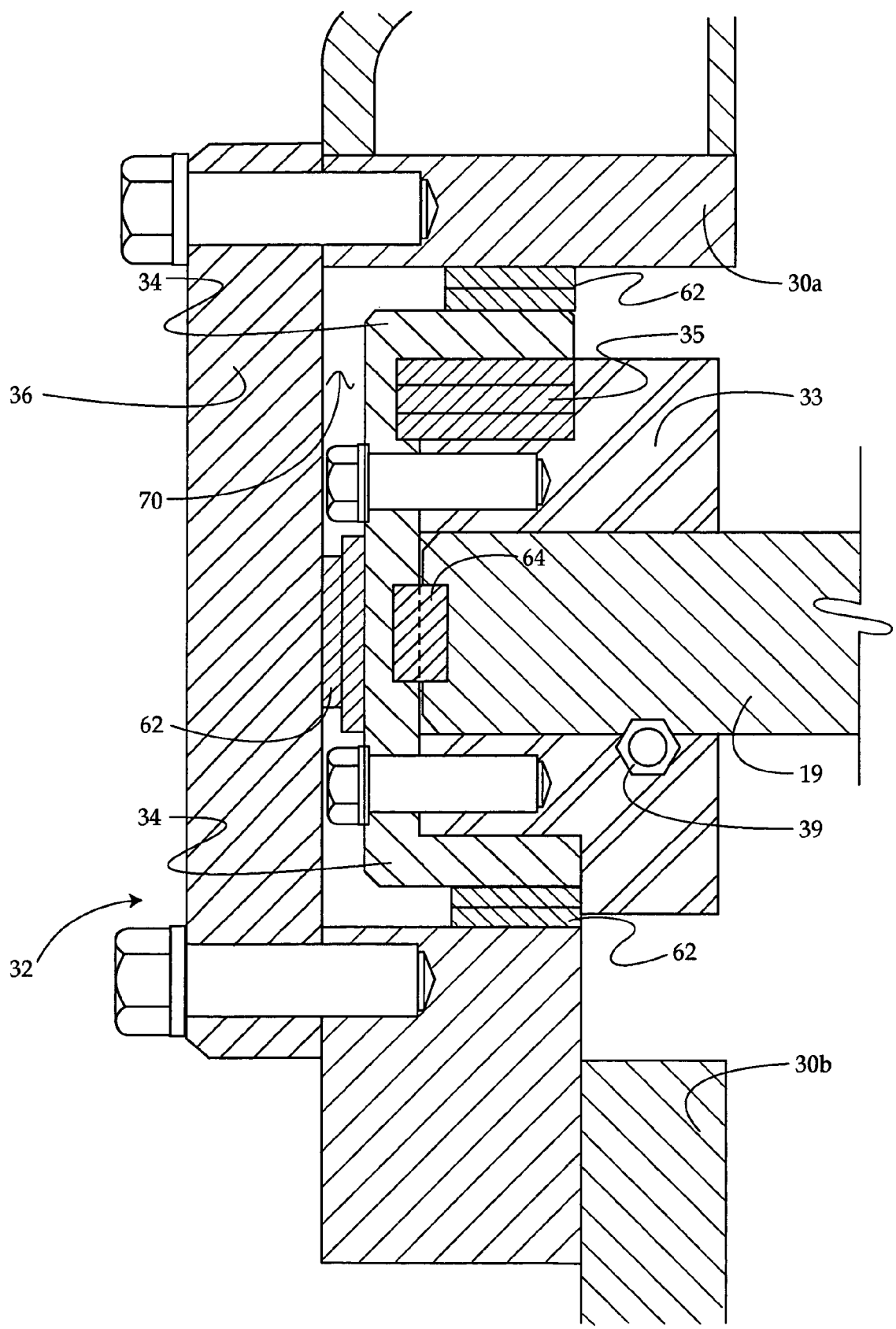
FIG. 5 is a sectioned diagrammatic end view of a vertical idler adjuster according to another preferred embodiment of the present disclosure.

Referring to FIG. 5, there is shown yet another embodiment of an idler adjuster according to the present disclosure. As with regard to FIG. 4, like numerals are used in FIG. 5 to identify features alike to those discussed above. Idler adjuster 32 of FIG. 5 includes a side plate 36 similar to the side plate of the FIG. 4 embodiment, but differing in that it is attached to upper and lower arms 30*a* and 30*b* rather than to mounting member 34. Side plate 36 of FIG. 5 is thus stationary with respect to idler adjuster 32. Wear strips 62 are preferably positioned between upper and lower arms 30*a* and 30*b* and mounting member 34, and also between side plate 36 and mounting member 34. The wear strip 62 disposed adjacent support block 33, and pinned thereto, may be larger than the adjacent wear strip to accommodate vertical adjustment of block 33 relative to side plate 36. FIG. 5 further includes wedge 39 for fixing idler shaft 19 relative to support block 33. Wedge 39 is preferably connected to both of shaft 19 and support block 33, and extends into a complementary slots (not shown) in shaft 19 and support block 33 such that shaft 19 cannot rotate relative to support block 33. A stopper 64 is preferably provided and may be a rubber cork or some other sealing material locating in a centerline hole in the idler shaft. The presently described arrangement allows access to the stopper by removing side plate 36, and the components of idler adjuster 32. Stopper 64 can be removed, for example, to check the oil level in idler 18, or to add oil if needed.

Figure 6:
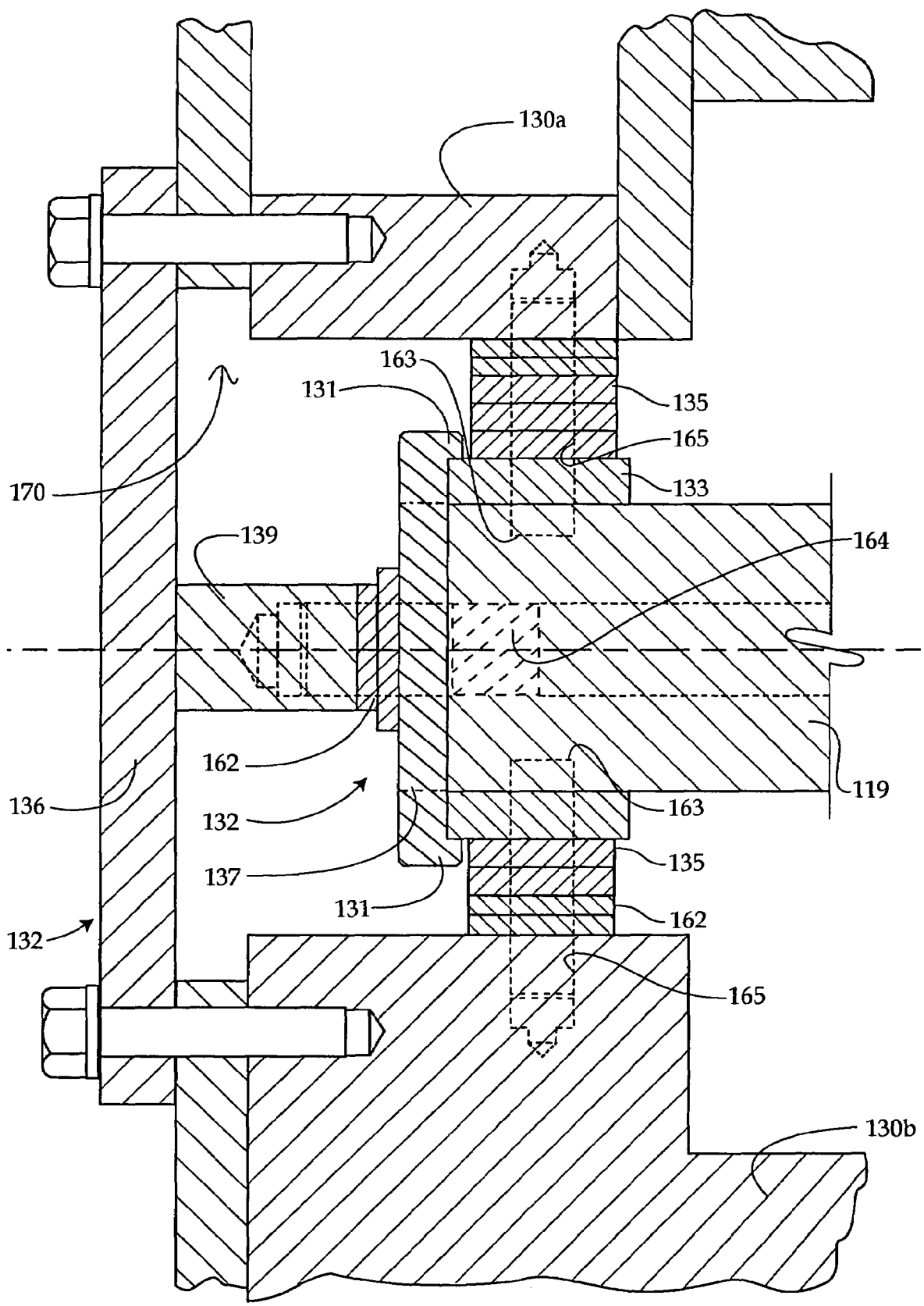
FIG. 6 is a sectioned diagrammatic end view of a vertical idler adjuster according to another preferred embodiment of the present disclosure.

Referring to FIG. 6, there is shown yet another preferred embodiment of the present disclosure, including a vertical idler adjuster 132. Idler adjuster 132 is similar to the foregoing embodiments, and like numerals are used to identify features alike to those described above. Idler adjuster 132 differs from the foregoing embodiments, among other things, in that a mounting member is omitted from the design. Idler adjuster 132 includes a support block 133 preferably disposed between upper 130a and lower 130b roller frame arms. A plurality of spacers are each positioned between support block 133 and arms 130a and 130b, similar to the foregoing embodiments. A side plate 136 is preferably mounted to arms 130a and 130b, and preferably includes an extension 139 extending toward support block 133. Wear strips 162 are preferably positioned between arms 130a and 130b and support block 133, and also between extension 139 and a key 137. As spacers 135 are moved from location to location, moving the idler and support block 133 up and down, the wear strip 162, doweled directly to support block 133 also moves up and down. To maintain contact between the wear strips, the wear strip doweled to support block 133 is preferably widened.

Key 137 is preferably coupled to idler shaft 119, preferably fitted into a slot across the end thereof. Similar to the foregoing embodiments, key 137 prevents rotation of idler shaft 119. Key 137 preferably includes shoulders 131 that fit over and under, respectively, upper and lower sides of support block 133. In other preferred embodiments, key 137 may alternatively or inclusively have a rib or similar structure that fits with a mating slot on support block 133, the slot preferably extending generally in a direction between arms 130a and 130b. Alternative means of keeping key 137 in place might include, for example, a pin extending between support block 133 and key 137. Further still, key 137 might be retained in place by re-positioning or sizing spacers 135 such that they extend over the top and bottom of key 137, rather than providing the same with shoulders 131. It is further contemplated that key 137 might be fashioned as a single component with support block 133.

Idler adjuster 132 further preferably includes wear strips 162 adjacent upper 130a and lower 130b arms, and having dowels 163 that preferably extend through spacers 135. Dowels 163 trap spacers 135 in position and fix wear strips 162 against displacement relative to support block 133, as it slides relative to arms 130a and 130b during absorption of non-vertical loads on the associated idler. In a preferred embodiment, dowels 163 are received in bores 165 and are adjustable in their depths therein. Such a design facilitates removal or insertion of spacers 135, as wear strips 162 can be spaced relative to support block 133 depending upon the number of spacers there between without removing wear strips 162. In a preferred embodiment, the wear strips 162 between key 137 and extension 139 are also equipped with dowels, similar to the foregoing description.

Figures 7, 8:
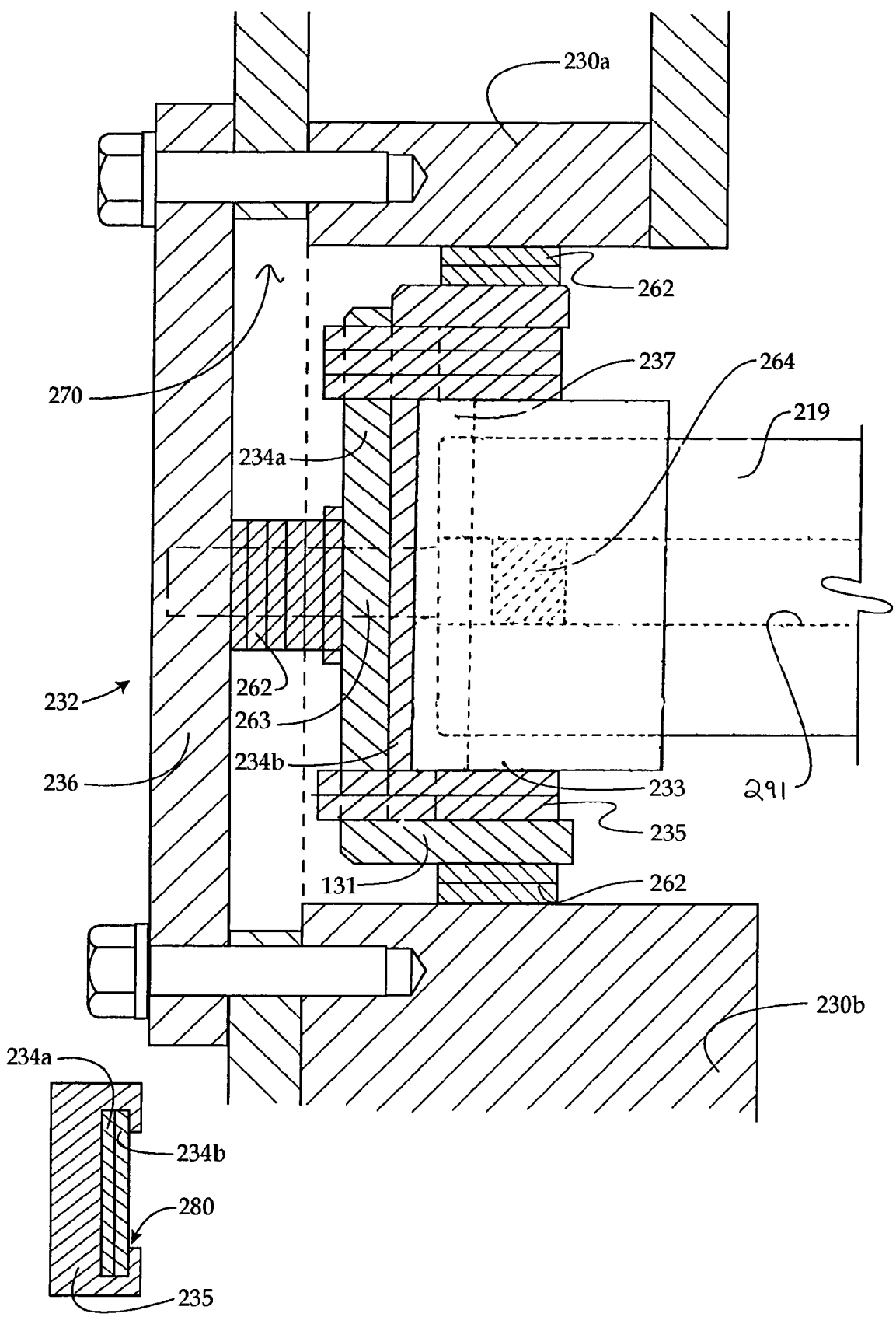
FIG. 7 is a sectioned diagrammatic end view of a vertical idler adjuster according to another preferred embodiment of the present disclosure.
FIG. 8 is a top diagrammatic partial view of the vertical idler adjuster of FIG. 7.

Referring to FIG. 7, there is shown yet another preferred embodiment of the present disclosure, including a vertical idler adjuster 232. Idler adjuster 232 has similarities with the foregoing embodiments and, accordingly, like numerals are used to identify like features to those discussed above. Idler adjuster 232 includes a support block 233 disposed between upper 230a and lower 230b roller frame arms, and a side plate 236 attached to arms 230a and 230b. A window 270 extends between arms 230a and 230b, and is generally covered by side plate 236. Idler adjuster 232 further includes a two-piece mounting member, including first and second L-shaped mounting member portions 234a and 234b. A key 237, similar to the key 137 of the FIG. 6 embodiment, is preferably provided and functions in a similar manner to fix an idler shaft 219 against rotation in support block 233. In a preferred embodiment, each of portions 234a and 234b extends over a side of support block 233 and assists in retaining spacers 235 between support block 233 and roller frame arms 230a and 230b. Wear strips 262 are preferably positioned between roller frame arms 230a and 230b and mounting member portions 234a and 234b, and also between portions 234a and 234b and side plate 236. In a preferred embodiment, the wear strips 262 disposed between side plate 236 and mounting member portions 234a and 234b are pinned with a dowel 263 to portions 234a and 234b and/or key 237. It will be noted that the FIG. 7 embodiment includes a stopper 264 in a bore 291 of idler shaft 219.

Turning to FIG. 8, there is shown a view of spacers 235 of FIG. 7 and mounting member portions 234a and 234b. As illustrated, portions 234a and 234b are preferably positioned adjacently, and fit within a complementary space 280 defined by the respective spacer 235, which is preferably generally C-shaped. Thus, each of spacers 235 can be fitted about and retained by portions 234a and 234b.

INDUSTRIAL APPLICABILITY

Figure 9:
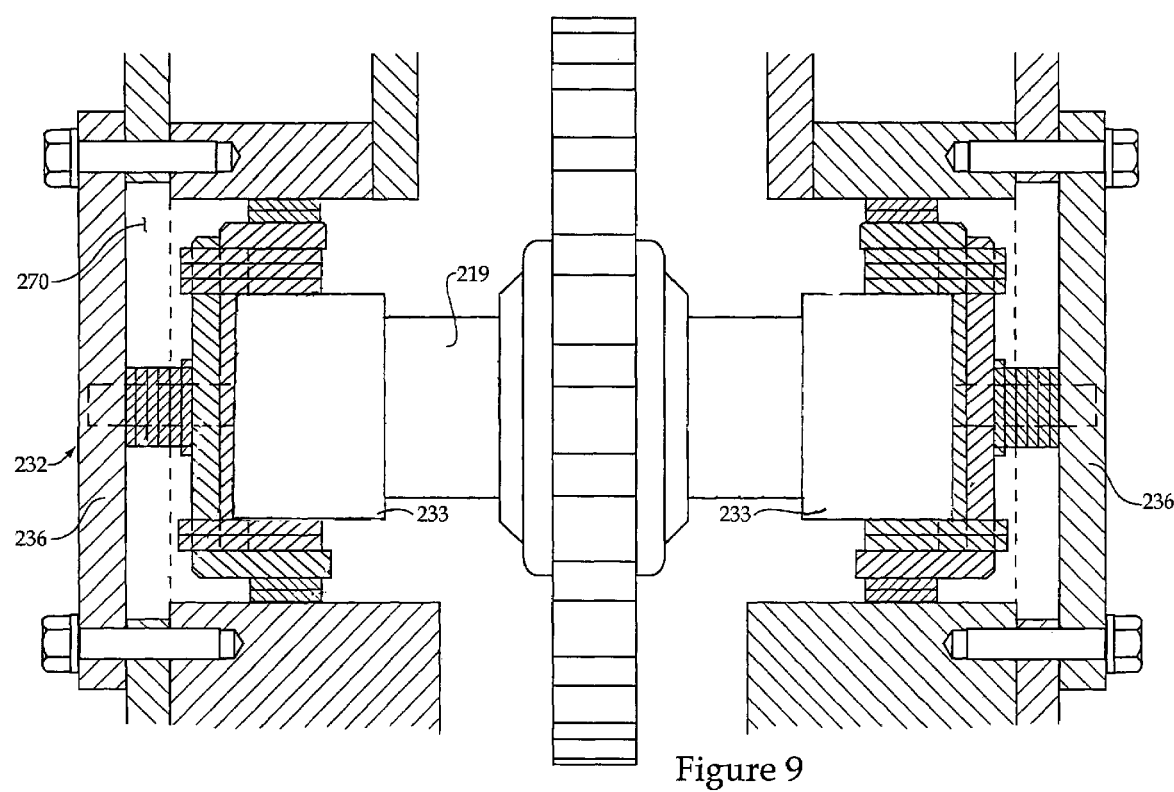
FIG. 9 is a partially sectioned end view of a portion of a machine having a vertical idler adjuster according to the present disclosure.
Figure 10:
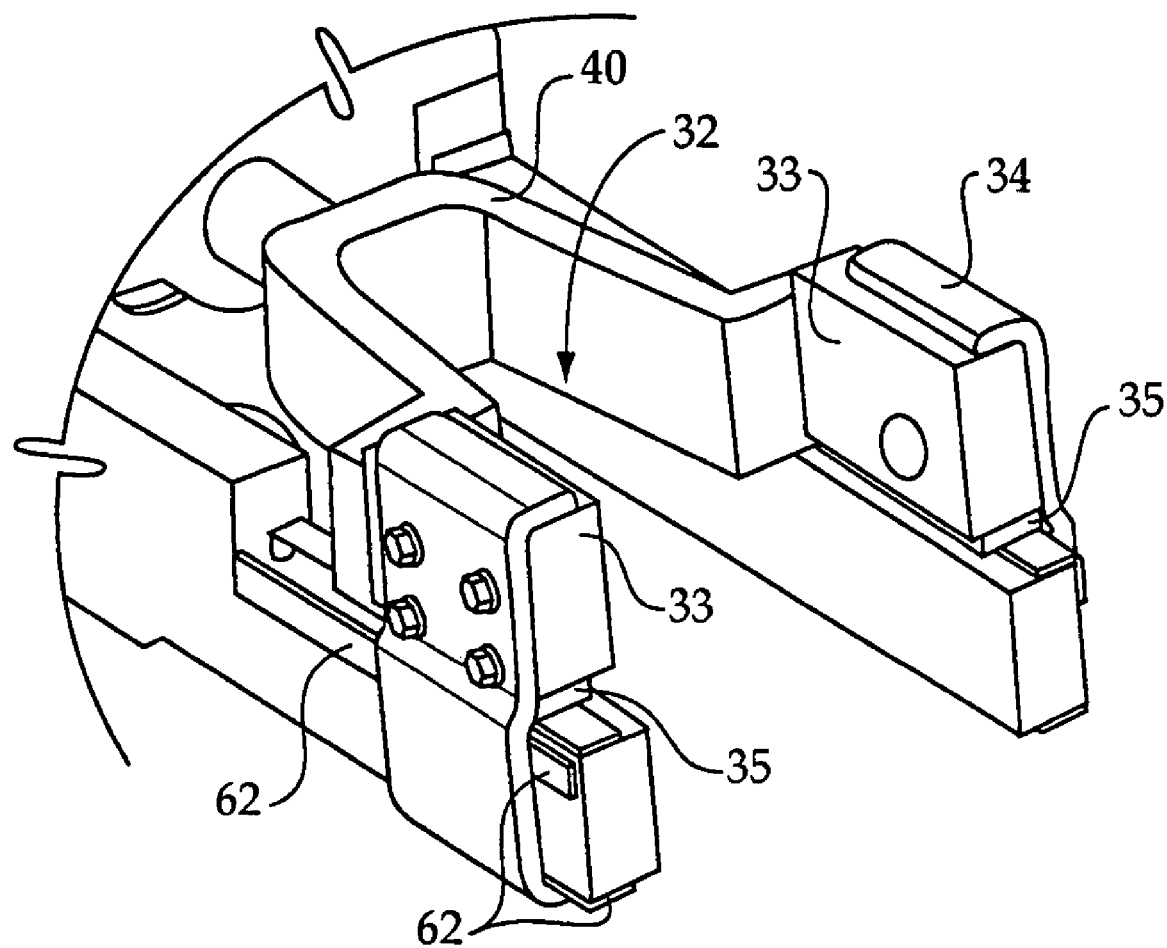
FIG. 10 is a partial perspective diagrammatic view of a track roller frame and vertical idler adjuster according to the present disclosure.
Figure 11:
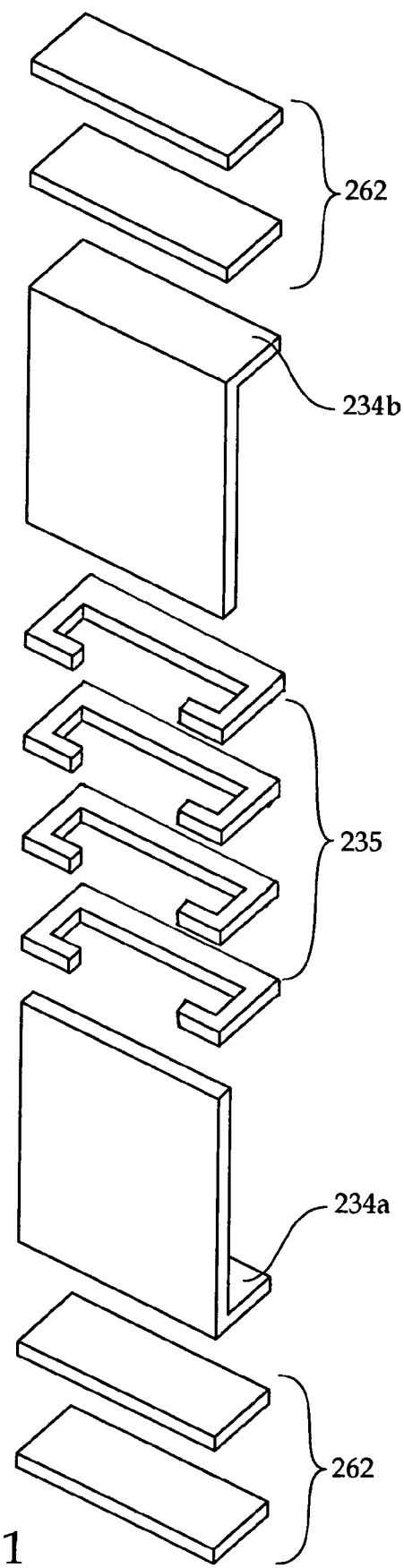
FIG. 11 is an exploded view of a portion of the vertical idler adjuster shown in FIG. 7.

Referring to the drawing Figures generally, work machine 10 will over the course of a period of operation experience wear of various components, including track 14 and rollers 20. Accordingly, after a certain period of operation, the idler plane "I" will lie in a position relative to the roller plane "R" that differs from its desired position. To continue working within desired specifications, it will be desirable to vertically adjust the position of idler plane I relative to roller plane R, restoring the same to the desired relative positions, typically by raising the position of idler 18 relative to roller frame 30. It should be understood that the following description, while focused primarily on the embodiments of FIGS. 1–6, is also generally applicable to the embodiments of FIGS. 7–9.

Idler adjuster 32 is used to vertically adjust idler 18 to compensate for the faster rate of change in the position of roller plane R than in idler plane I. Idler plane translation is a function of bushing and tooth root wear, whereas roller plane translation is a function of roller and link wear. In earlier designs, using non-rotating bushings, the translation of the work machine's idler plane was faster. With the advent of rotating bushings and idler/bushing engagement, idler plane translation in many applications has slowed while translation of the roller plane continues at approximately the same rate. The translation rate of roller plane R may be about five times the translation rate of idler plane I. For example, where roller plane R translates 10 mm, idler plane I may translate only about 2 mm, a difference of about 8 mm. In certain applications, an 8 mm departure, or less, from specifications in the relative positions of planes R and I can affect operation. Accordingly, spacers 35 can be designed having a thickness equal to the relative displacement of planes R and I at which adjustment is desirable. Thus, switching or insertion of a single spacer 35 can adjust idler 18 back to its desired position.

Referring in particular to FIGS. 3–5, there are shown the respective embodiments of idler adjuster 32 as it would appear prior to performing any adjustment of the position of the idler. This condition would exist, for example, where work machine 10 is relatively new or has relatively recently been equipped with a new undercarriage and idler adjuster 32. Spacers 35 are all positioned above support block 33, in the case of the embodiments of FIGS. 3 and 4, the side of support block 33 closest to upper arm 30a.

In a preferred embodiment, the relative position of support block 33, and consequently idler shaft 19 and idler 18, is adjusted by switching one or more of spacers 35 from above support block 33 to a position below support block 33. Spacers 35 may be re-positioned on the basis of a certain number of operating hours having passed, or measurement of the actual vertical position of idler 18. Such factors as the number and thickness of spacers 35 can be varied in accord with a servicing schedule. For example, where relatively frequent servicing of work machine 10 is contemplated (for any reason, such as lubrication, engine tune-ups, or idler adjustment), it may be desirable to provide spacers 35 that are relatively thin, allowing fine adjustments of the idler at each servicing stop. In contrast, if servicing is desired only after a relatively long operating time, with significant wear, it may be desirable to utilize relatively thick spacers such that switching of a single spacer can effect a relatively large adjustment of the position of idler 18.

Vertical idler adjustment typically begins by removing side plate 36 such that access to the internal components of idler adjuster 32 may be obtained. Prior to performing any adjustment, it may be necessary to position the idler at the appropriate horizontal position such that access to the idler adjuster 32, 132, 232 is possible, for example via window 170, 270. In order to re-position a spacer 35 under support block 33, the weight of idler 18 bearing against support block 33 and mounting member 34 is preferably relieved or reduced. The idler is next raised, if necessary, to generate a gap for insertion or removal of a spacer, and may then be blocked in place. The idler may be raised, for example, by jacking idler 18 itself upwardly relative to roller frame 30. Generating a gap by some means is generally necessary prior to inserting a spacer 35 at the opposite side of support block 33. One or more of spacers 35 can thus be removed from above support block 33, and re-positioned below the same in a space created for the switched spacer under support block 33. In a preferred embodiment, support blocks 33, 133, 233 are removed through the window 170, 270, if necessary. When servicing is complete, idler 18 will be "un-jacked," and also returned to a desired horizontal (fore-aft) position, if necessary. Access via the side plates 36, 136, 236 may also be used for lubrication of the components, replacing wear strips 62, 162, 262 or positioning shims under the same. It is contemplated that one spacer at a time will be switched at each side of idler 18, incrementally adjusting idler 18 in accordance with relative migration/translation of roller and idler planes R and I, respectively, such that they are at each adjustment or servicing stop returned to the desired relative positions.

Once all of spacers 35 have been re-positioned as described, track assembly 13 is typically ready to be rebuilt. Those skilled in the art will appreciate that the presently disclosed embodiments provide a means for incremental adjustment of the idlers of a work machine, which can be done in the field and with simple hand tools. It is unnecessary to break the track or horizontally adjust or remove the idler to vertically adjust the same. The entire set of spacers necessary to reposition idler 18 over the life of the work machine undercarriage is preferably carried on board work machine 10, although alternative embodiments are contemplated in which the spacers are not carried with idler adjuster 32, or even on board work machine 10 at all. For example, rather than switching spacers 35 from an upper to lower position, spacers stored elsewhere can simply be added below support block 33 to adjust the same.

Referring in particular to FIG. 6, the elimination of the mounting members in idler adjuster 132 provides for a relatively smaller window 170 in the roller frame between upper 130a and lower 130b arms. Because window 170 is relatively smaller, idler adjuster 132 provides for increased strengthening of the track roller frame. In addition, the elimination of the mounting members of the other embodiments described herein provides for easier access to spacers 125 for switching thereof in some instances.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For example, rather than sets of spacers disposed at each side of the idler, larger, generally U-shaped spacers might be utilized that extended about the idler, and thus support and position the idler shaft at each end thereof. Different operating conditions may be best suited to fine adjustments of the idler either up or down relative to the roller frame, and those skilled in the art will therefore appreciate that the present disclosure is not limited in its application to a means only for raising the idler. Further still, although the present disclosure has been described in the context of a work machine having the drive sprocket and idler at front and rear positions of the track, the present disclosure is similarly applicable to track type work machines with elevated sprockets. In a work machine with an elevated sprocket, a drive sprocket is positioned between front and rear ends of the track, and elevated relative thereto. Thus, in such an application, the track traverses a generally three-sided path, extending about one or more drive rollers, and one or more idlers. Other aspects, features and advantages will be apparent upon an examination of the attached drawing figures and appended claims.

What is claimed is:

1. A track type work machine comprising:
    a roller frame;
    a rotatable idler mounted proximate an end of said roller frame, said idler having an idler shaft supported within at least one support block;
    a track extending about said idler; and
    a vertical idler adjuster disposed adjacent said idler shaft and comprising at least one removable spacer separate from said at least one support block, said vertical idler adjuster being configured to adjust a vertical position of said idler shaft relative to said roller frame.

2. A track type work machine comprising:
    a roller frame;
    a rotatable idler mounted proximate an end of said roller frame, said idler having an idler shaft;
    a track extending about said idler;
    a vertical idler adjuster disposed adjacent said idler shaft and comprising at least one removable spacer to adjust a vertical position of said idler shaft relative to said roller frame;
    said vertical idler adjuster comprising a first vertical idler adjuster;
    a first and a second support block supporting said idler shaft; and
    a second vertical idler adjuster, said first and second vertical idler adjusters being associated with said first and second support blocks, respectively;

said at least one spacer including at least a first and a second removable spacer positionable between said first and second support blocks and said roller frame, respectively.

3. The work machine of claim 2 wherein:
said first vertical idler adjuster includes a first set of removable spacers stored on board the work machine adjacent said first support block; and
said second vertical idler adjuster includes a second set of removable spacers stored for carrying on board the work machine adjacent said second support block.

4. The work machine of claim 3 wherein each of said spacers of said first and second sets is stored in a manner to inhibit said first and second sets from slipping out of respective positions adjacent the respective support block.

5. The work machine of claim 3 comprising first and second cover plates concealing said first and second idler adjusters, respectively, each said cover plate connected to one of: the adjacent idler adjuster; and, said roller frame.

6. The work machine of claim 5 wherein said roller frame comprises upper and lower arms;
said work machine further comprising first and second mounting members, each of said mounting members comprises a C-shaped body having first and second walls disposed adjacent said upper and lower arms, respectively, wherein one of said first and second sets of spacers and one of said support blocks is positioned between the first and second walls of each said mounting member.

7. The work machine of claim 5 comprising first and second mounting members, each of said mounting members having a first L-shaped portion and a second L-shaped portion adjacent said first L-shaped portion, said first and second portions extending through slots defined by one of said first and second sets of spacers.

8. The work machine of claim 1 wherein:
at least one of said support block and said idler shaft has a slot disposed therein; and further comprising
a key positionable in said slot to prevent rotation of said shaft relative to said support block.

9. A work machine idler mounting assembly comprising:
a frame;
an idler support block disposed proximate an end of said frame and configured to support an idler shaft therein; and
at least one removable spacer positionable between said idler support block and the frame to adjust relative positions thereof.

10. A work machine idler mounting assembly comprising:
a frame;
an idler support block disposed proximate an end of said frame; and
at least one removable spacer positionable between said idler support block and the frame to adjust relative positions thereof;
said at least one removable spacer comprises a plurality of identical spacers stored on board a work machine including said idler mounting assembly between said idler support block and said frame;
said spacers are positionable singly or plurally at either of first and second sides of said idler support block to incrementally raise or lower the idler support block relative to said frame.

11. The idler mounting assembly of claim 10 wherein each of said spacers is engageable with at least one of: said idler support block; and, a mounting member disposed adjacent said idler support block.

12. The idler mounting assembly of claim 11 wherein each of said spacers interlocks with said mounting member.

13. The idler mounting assembly of claim 11 wherein:
said mounting member comprises a first mounting member and said idler mounting assembly comprises a second mounting member, said first and second mounting members being disposed on said frame;
said idler support block comprises a first idler support block and said idler mounting assembly comprises a second idler support block, said first and second idler support blocks being connected with each of said first and second mounting members, respectively; and
said plurality of identical spacers includes first and second sets of spacers associated with each of said first and second idler support blocks, respectively.

14. The idler mounting assembly of claim 13 comprising:
a first and a second cover plate disposed over each of said first and second sets of spacers, respectively;
said cover plates connected to one of said frame or said first and second mounting members.

15. The idler mounting apparatus of claim 9 comprising a key adjacent said idler support block and engageable therewith, said key extending through said support block to engage with an end of an idler shaft.

16. A work machine idler mounting assembly comprising:
a frame;
an idler support block disposed proximate an end of said frame;
at least one removable spacer positionable between said idler support block and the frame to adjust relative positions thereof; and
first and second L-shaped mounting member portions positioned adjacent said support block, said L-shaped mounting member portions being engageable with said at least one spacer and fitting into a slot defined thereby.

17. A method of vertically adjusting the position of a rotatable idler in a track type work machine, the method comprising the steps of:
relieving pressure on an idler adjuster supporting an idler shaft of the idler, the idler shaft being positioned within at least one support block; and
removing or inserting at least one spacer, separate from the at least one support block, in the idler adjuster at a position between the idler shaft and a roller frame of the work machine to adjust the relative positions thereof.

18. A method of vertically adjusting the position of a rotatable idler in a track type work machine, the method comprising the steps of:
relieving pressure on an idler adjuster supporting an idler shaft of the idler; and
removing or inserting at least one spacer in the idler adjuster at a position between the idler shaft and a roller frame of the work machine to adjust relative positions thereof;
wherein the step of removing or inserting at least one spacer comprises removing a spacer from a first position on a first side of the idler shaft and inserting said spacer in a second position on a second side of the idler shaft.

19. The method of claim 18 wherein the step of removing or inserting at least one spacer comprises:
sequentially moving a plurality of spacers carried on board the work machine and stored at positions vertically above the idler shaft to positions vertically below the idler shaft at predetermined intervals.

* * * * *

UNITED STATES PATENT AND TRADEMARK OFFICE
CERTIFICATE OF CORRECTION

| | | |
|---|---|---|
| PATENT NO. | : 7,237,631 B2 | Page 1 of 1 |
| APPLICATION NO. | : 10/937058 | |
| DATED | : July 3, 2007 | |
| INVENTOR(S) | : Livesay et al. | |

It is certified that error appears in the above-identified patent and that said Letters Patent is hereby corrected as shown below:

In Column 9, Line 10, in Claim 3, after "stored" delete "for carrying"

Signed and Sealed this

Sixth Day of May, 2008

JON W. DUDAS
*Director of the United States Patent and Trademark Office*